Feb. 14, 1956 F. W. GREER 2,734,283
CONVEYOR TRAYS
Original Filed April 13, 1951
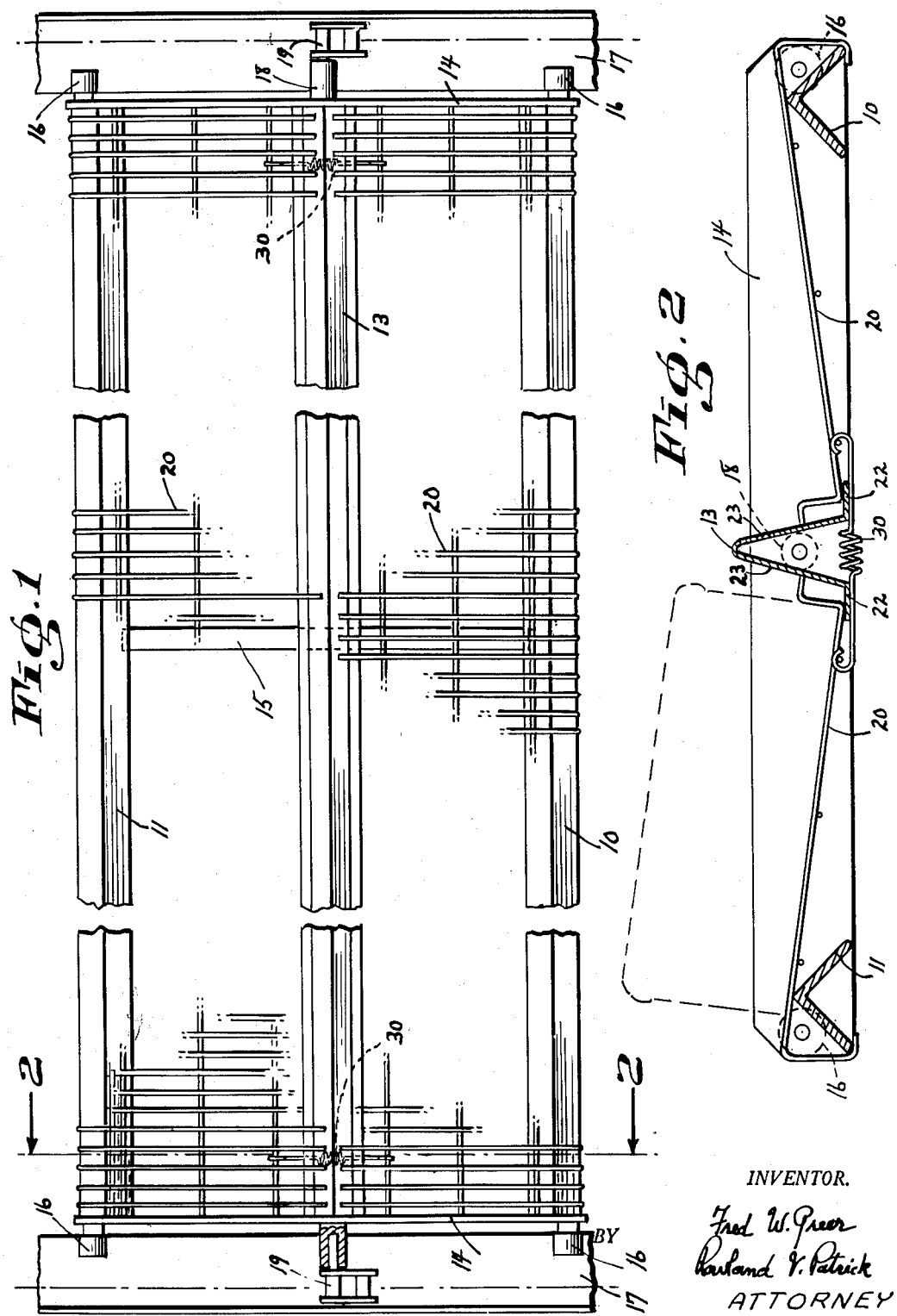
INVENTOR.
Fred W. Greer
Rowland V. Patrick
ATTORNEY

United States Patent Office 2,734,283
Patented Feb. 14, 1956

2,734,283

CONVEYOR TRAYS

Fred W. Greer, Belmont, Mass., assignor to J. W. Greer Company, Cambridge, Mass., a corporation of Massachusetts Original application April 13, 1951, Serial No. 220,927. Divided and this application July 26, 1952, Serial No. 301,065

3 Claims. (Cl. 34—238)

This invention relates to conveyor trays and more particularly to a tray having a chassis adapted to be carried between spaced parallel conveyor chains, the chassis being provided with a detachable article supporting surface preferably in the form of a grid, which may be readily detached for cleaning purposes.

It is one object of the invention to provide such a tray wherein the article supporting surface may be readily detached or interchangeably replaced, and yet will be firmly secured to the tray chassis during operation.

It is a further object of the invention to provide a tray having two independent article supporting surfaces, preferably in the form of grids, which are secured to the tray chassis by common means.

It is a further object of the invention to provide a tray having few parts and of light-weight construction which will be dimensionally stable.

Further objects of the invention are to provide a tray for carrying two separated rows of articles, such as standard bread loaves, for cooling, and to provide such a tray wherein one or both of the article supporting surfaces are inclined downwardly towards the center of the tray to aid in retaining articles supported thereon.

A typical embodiment of my invention is shown in the accompanying drawings, wherein—

Fig. 1 is a plan view of a conveyor tray, broken away to indicate extent, and showing fragmentary portions of conveyor chains between which the tray is carried; and Fig. 2 is a cross-sectional view taken along the line 2—2 of Fig. 1, indicating in dotted lines a loaf of bread carried on one side of the tray.

Each tray comprises a chassis or framework constituted of two inverted angle irons 10 and 11 and a central A-shaped member 13, all held in parallel spaced relation by end strips 14 and any number of intermediate transverse bars 15, as required, depending upon the dimensions. The end pieces 14 have suitable pins extending outwardly therefrom and supporting idler rollers 16 for rolling engagement on guide rails 17 of a conveyor system. The end strips 14 centrally thereof also have suitable connections 18 for pivotally engaging the conveyor chains indicated fragmentarily at 19. As shown, the central member 13 divides the tray medially and the article supporting surfaces are provided by two separate grids 20 formed of wire mesh or other stiff reticulate material. Each grid is shaped so that it will rest on the framework in a position inclined downwardly towards the central member 13. The grid-forming elements are therefore bent over at their outer edges into hook shape, as shown in Fig. 2, and at their inner edges are bent upwardly and inwardly so that they rest both upon the base flanges 22 and against the side portions 23 of the central member 13 and provide inner abutments to engage the inner ends of the loaves of bread while they are carried on the tray. The bent-over outer edge portions of the grid elements are thus hooked around the angle irons 10 and 11, respectively.

The grids 20 are fastened in these positions by two or more spring clips 30 which extend beneath the central member 13, their ends being hook-shaped so that the hooks may be detachably passed around wires of the two separate grids to yieldingly hold the two grids inwardly and downwardly on the tray framework. This type of assembly is extremely convenient when it comes to cleaning or repairing the grids as they may be readily removed merely by unfastening the spring clips 50.

This application is a division of my co-pending application, Serial No. 220,927, filed April 13, 1951.

I claim:

1. A conveyor tray comprising a longitudinally extending central supporting member, edge members substantially parallel to said central member and spaced therefrom, a grid spanning the space between each edge member and said central member and a series of spring clips extending beneath said central member and detachably connected to at least one of said grids for yieldingly retaining said grids against said central member.

2. A conveyor tray as claimed in claim 1, wherein the outer edge of each grid is hooked over one of said edge members to retain said grids against vertical separation from said edge member.

3. A double row conveyor tray for bread and the like comprising a longitudinally extending central supporting member, edge members substantially parallel to said central member and spaced therefrom, a grid spanning the space between each edge member and said central member and being inclined upwardly from said supporting member to said edge members and a series of spring clips extending beneath said central member between said grids and detachably connected to at least one of said grids for yieldingly retaining said grids against said central member.

References Cited in the file of this patent

UNITED STATES PATENTS

| 873,664 | Estler | Dec. 10, 1907 |
| 1,428,721 | Towne | Sept. 12, 1922 |
| 1,680,441 | Adams | Aug. 14, 1928 |
| 2,458,113 | Stevens | Jan. 4, 1949 |
| 2,575,278 | Kearney | Nov. 13, 1951 |
| 2,631,042 | Bertram | Mar. 10, 1953 |
| 2,677,198 | Doll | May 4, 1954 |